Nov. 28, 1944.    G. SCHIEMAN    2,364,001
TRANSLUCENT FIBER TISSUE PRESSURE-SENSITIVE ADHESIVE TAPE
Filed Dec. 2, 1942
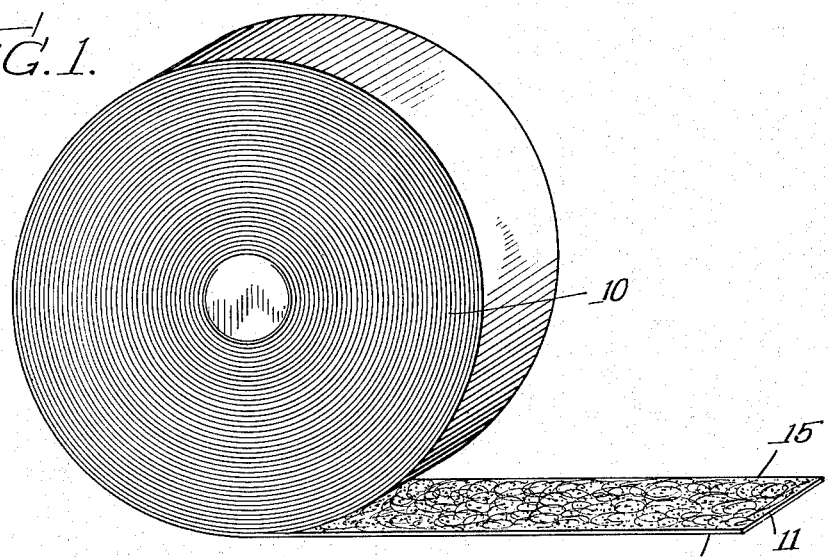
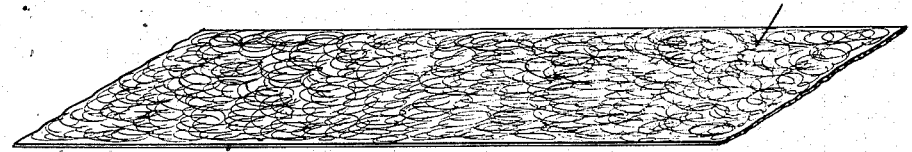
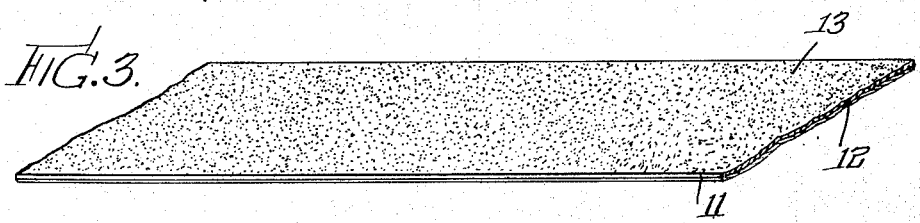
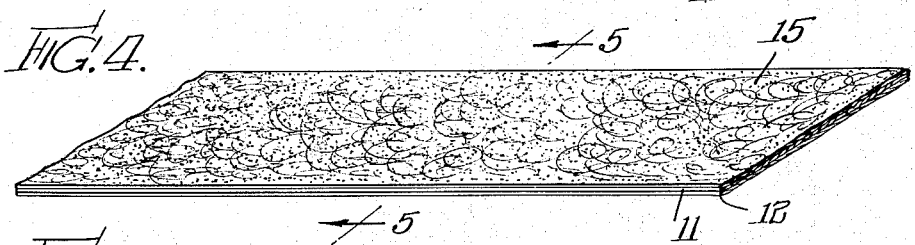
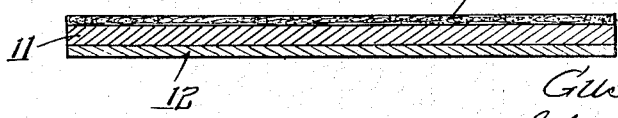
INVENTOR.
Gustave Schieman
By:- Loftus Moore Olson & Trexler
attys.

Patented Nov. 28, 1944

2,364,001

UNITED STATES PATENT OFFICE 2,364,001

TRANSLUCENT FIBER TISSUE PRESSURE-SENSITIVE ADHESIVE TAPE

Gustave Schieman, Bronx, N. Y., assignor to International Plastic Corporation, Morristown, N. J., a corporation of Illinois Application December 2, 1942, Serial No. 467,621

1 Claim. (Cl. 154—43)

My invention relates to a pressure-sensitive adhesive tape, film or sheet.

It is an object of my invention to provide a composite tape, film or sheet of this class with increased tensile strength, at substantially no increase in cost or loss of flexibility, and which eliminates the stringiness or oozing of adhesive beyond the edges of the tape or composite structure.

It has been attempted to provide a cellulose fiber tissue tape or sheet in which two coatings of adhesive are necessary, one coating between the film or base and the fiber tissue which serves as a bond, and a second adhesive coating or lamination on the exposed surface of the fiber tissue itself, which latter coating or lamination provides the actual tacky or adhesive properties. It is a more specific object of my invention to provide a cellulose fiber tissue tape with but one coat or lamination of adhesive, in which I intermesh a thin, porous, fiber tissue so that the single coating of adhesive not only acts as a bond but affords the adhesion properties on the opposite surface of the fiber tissue, thus providing a structure which greatly simplifies the manufacturing procedure and reduces the time element required by one-half.

In the drawing:

Fig. 1 illustrates a roll of tape embodying one form of my invention.

Fig. 2 is a perspective view of a relatively thin, highly porous fiber tissue, commonly known in the trade as Japanese tissue, utilized in making my composite structure.

Fig. 3 is a perspective view of my structure during a certain stage of the process of manufacture, showing a cellulose base or film with repellent on one surface and a suitable adhesive on the opposite surface.

Fig. 4 shows the structure of Fig. 3 after the Japanese tissue in Fig. 2 has been pressure applied.

Fig. 5 is a cross-sectional view on the line 5—5 of Fig. 4, looking in the direction indicated by the arrows, showing the finished structure.

Generally speaking, my improved tape consists of a cellulosic base. Directly applied to one side thereof is a suitable repellent coating, and directly applied to the opposite side is a suitable pressure-sensitive adhesive. Pressure applied to and in the adhesive coating is a relatively thin, highly porous fiber tissue. The one single coating of adhesive not only serves to bond the tissue to the base, but it is of a character to permit the adhesive to penetrate or ooze through and form a tacky adhesive surface on the opposite side of the fiber tissue. My improved method of manufacturing comprises the steps of applying a repellent coating to one side of the cellulosic base and then drying the repellent; applying a suitable adhesive to the opposite side of the cellulosic base and then immediately directly applying to the adhesive coating, by pressure, a thin, translucent, porous, fiber tissue in such a manner as to cause the adhesive to ooze or penetrate through the fiber tissue; and then drying the adhesive. By a "repellent" is meant a material with respect to which the adhesive used exhibits little or no tack and from which the adhesive readily separates without damage to either the repellent or adhesive, i. e., without offsetting, even after the repellent and adhesive have been in contact for long periods of time under pressures such as are encountered in a roll of adhesive tape.

Referring to the drawing more in detail, 10 indicates a roll of tape. This tape consists of a cellulosic base 11. To one surface of the cellulosic base there is applied a coating of suitable repellent 12, and on the opposite side of the cellulosic base there is applied, as best indicated in Fig. 3, a coat of suitable adhesive 13. Promptly after the application of the adhesive, the relatively thin, highly porous fiber tissue 14, preferably Japanese tissue, shown in Fig. 2, is pressure-applied to the adhesive coating by any suitable means not shown, but in a manner to cause the adhesive to penetrate or ooze through the translucent fiber sheet 14 in such a manner as to intermesh therewith and to form in effect a composite lamination of fiber tissue and adhesive, which I indicate as 15, in the finshed product. My preferred translucent fiber tissue is relatively thin, highly porous, and is known in the trade as Japanese tissue. However, any fiber tissue of similar character will be satisfactory so long as it is of the required thinness and is sufficiently porous to allow the adhesive to penetrate or ooze through the tissue to such an extent as to provide a tacky adhesive-exposed surface, and of a character to permit the adhesive to intermesh with the fiber tissue to form, as it were, one composite layer or structure.

I prefer to use an adhesive that is highly plasticized, having a rubbery base of a low molecular weight. The degree of plasticity should be sufficient to permit the adhesive to ooze or penetrate through the fiber tissue to its opposite side so as to afford a tacky and adhesive-exposed surface on the fiber tissue. I have obtained highly satisfactory results with the adhesives having the following typical formulas:

1

| | Parts |
|---|---|
| Vistanex, m. w. 60,000 | 35 |
| Vistac (low m. w. polyisobutylene) | 40 |
| Zinc oxide (optional) | 15 |
| Hydrogenated terpene resin | 10 |
| Antioxidant | 1 |

2

| | |
|---|---|
| Pure gum stock reclaim | 50 |
| Soft hydrog. terpene resin | 50 |
| Antioxdiant | 1 |

3

| | |
|---|---|
| Pure gum stock reclaim | 40 |
| Milled crepe | 15 |
| Soft hydrog. terpene resin | 45 |
| Antioxidant | 1 |

As before stated, I prefer to use a translucent fiber tissue which is commonly known in the trade as Japanese tissue.

The repellent coating applied to one side of the cellulosic base may be of any suitable formula so long as it is repellent to the adhesive used, which need not be further described here except to say that I have used several different formulas with highly satisfactory results.

Having thus described my invention, 1 claim:

A flat tape structure comprising in combination a flexible base, a pressure-sensitive adhesive coating on one side of said base, and a thin, flat sheet of paper tissue directly applied to said adhesive coating for securing the base and tissue together as one composite structure with the adhesive coating penetrating through the tissue to provide a continuous tacky adhesive outer surface on one side of said composite structure whereby a strong, highly flexible composite tape is provided.

GUSTAVE SCHIEMAN.